US005335792A

United States Patent [19]

Hauch

[11] Patent Number: 5,335,792

[45] Date of Patent: Aug. 9, 1994

[54] GRAIN SEPARATOR

[75] Inventor: David A. Hauch, Afton, Minn.

[73] Assignee: Carter Day International, Inc., Minneapolis, Minn.

[21] Appl. No.: 839,808

[22] Filed: Feb. 21, 1992

[51] Int. Cl.[5] ........................ B07B 13/05; B65G 33/32

[52] U.S. Cl. ........................................ 209/687; 99/601; 99/609; 198/667; 198/674

[58] Field of Search ................ 209/673, 684, 687, 931; 99/601, 524, 609, 614, 615; 198/662, 667, 672, 674

[56] References Cited

U.S. PATENT DOCUMENTS

| | | | |
|---|---|---|---|
| 7,174 | 3/1850 | Menefee . | |
| 37,319 | 1/1863 | Cochrane . | |
| 137,430 | 4/1873 | Foreman et al. . | |
| 171,525 | 12/1875 | Merritt . | |
| 310,335 | 1/1885 | Tracy . | |
| 1,683,918 | 9/1928 | Riddell | 209/673 |
| 2,015,400 | 9/1935 | Ingraham | 209/687 |
| 2,182,638 | 12/1939 | Mjolsness | 209/687 |
| 2,861,684 | 11/1958 | MacGillivray | 209/687 |
| 4,392,421 | 7/1983 | Yano et al. | 209/687 X |
| 4,441,412 | 4/1984 | Imamura et al. | 99/601 |
| 4,730,554 | 3/1988 | Kristiaan | 198/662 X |
| 5,087,101 | 2/1992 | Justice et al. | 198/667 X |

FOREIGN PATENT DOCUMENTS

| | | | |
|---|---|---|---|
| 0474417 | 11/1937 | United Kingdom | 209/687 |

OTHER PUBLICATIONS

Custer Uni-Flow Grain Separator Catalog, Carter--Day Co. Feb. 1989.

Operating Instructions & Repair Parts Manual CC16-A, Carter-Day Co.

*Primary Examiner*—D. Glenn Dayoan
*Assistant Examiner*—Tuan N. Nguyen
*Attorney, Agent, or Firm*—Robert D. Schaffer

[57] ABSTRACT

A grain separator is disclosed comprising a plurality of operatively connected grain separator units and a grain inlet for feeding grain into the separator, wherein the grain is separated . The grain separator also has an outlet for dispensing the grain after the grain is separated and an internal drive for operating the units in separating grain.

9 Claims, 9 Drawing Sheets

GRAIN SEPARATOR

FIELD OF THE INVENTION

The present invention relates to grain separators and more particularly to a modular multi-unit grain separator having an internal drive system.

BACKGROUND OF THE INVENTION

Grain separators are generally used to separate a stream of grain containing various types and sizes of grain into its constituent parts. Typical grain separators are used to separate such grains as wheat, durum, oats, barley and rye.

In existing grain separators, several grain separator units may be stacked depending on the types of grain to be separated and the stream could be subjected to several separation processes in series. Alternatively, the grain stream could be divided up into several streams and be subjected to one separation step in parallel through several units.

In the existing grain separators, the motors and associated components for driving the individual grain separator units are located external to the grain separator. A separate motor and drive system is required for each unit. A great deal of additional space is required to accommodate these external drive systems. In addition, for safety reasons, guarding is required to cover the exposed pinion and gear drive systems. In the existing grain separator units, the components operate in a relatively dirty environment causing reduction in the useful life of the components.

Also, the construction and erection of existing grain separators is relatively complicated. For example, the placement of the drive system external to the grain separator units greatly complicates the arrangement of the inlet and outlet spouting for the grain streams.

Thus, there is a need to overcome the described disadvantages of existing grain separators.

SUMMARY OF THE INVENTION

The present invention provides a modular multi-unit grain separator which is relatively easy to construct and erect. The grain separator can be arranged to meet the varied needs of users, is relatively compact and provides for increased life of the drive system components. Accordingly, there is provided a grain separator having a plurality of modular grain separator units and a drive system which is modular in nature and located internal to the grain separator units.

The grain separator of the present invention separates grain according to the size, type and number of grains. The grain separator comprises a plurality of operatively connected modular grain separator units each having an internal drive system. The grain separator preferably has a single power source which drives the plurality of grain separator units. Each grain separator unit illustratively comprises a grain inlet feed hopper through which a grain inlet stream enters the separator unit, a rotatable means, operatively connected to the grain inlet feed hopper, for propelling grain through the separator unit, a separation means, operating in conjunction with the rotatable means, for separating the grain inlet stream into a first stream of grain and a second stream of grain, a drive system, internal to the grain separation unit, for driving the rotatable means, a first outlet spout, operatively connected to the separation means, through which the first stream of grain is dispensed from the grain separator unit, a second outlet spout, operatively connected to the separation means, through which the second stream of grain is dispensed from the grain separator unit, and coupling means for coupling together the drive systems of each grain separator unit.

The described modular multi-unit grain separator with internal modular drive system thus has the advantages of being easy to construct and erect, is relatively compact, and provides for increased life of the drive system components.

DETAILED DESCRIPTION

Figure 1A:
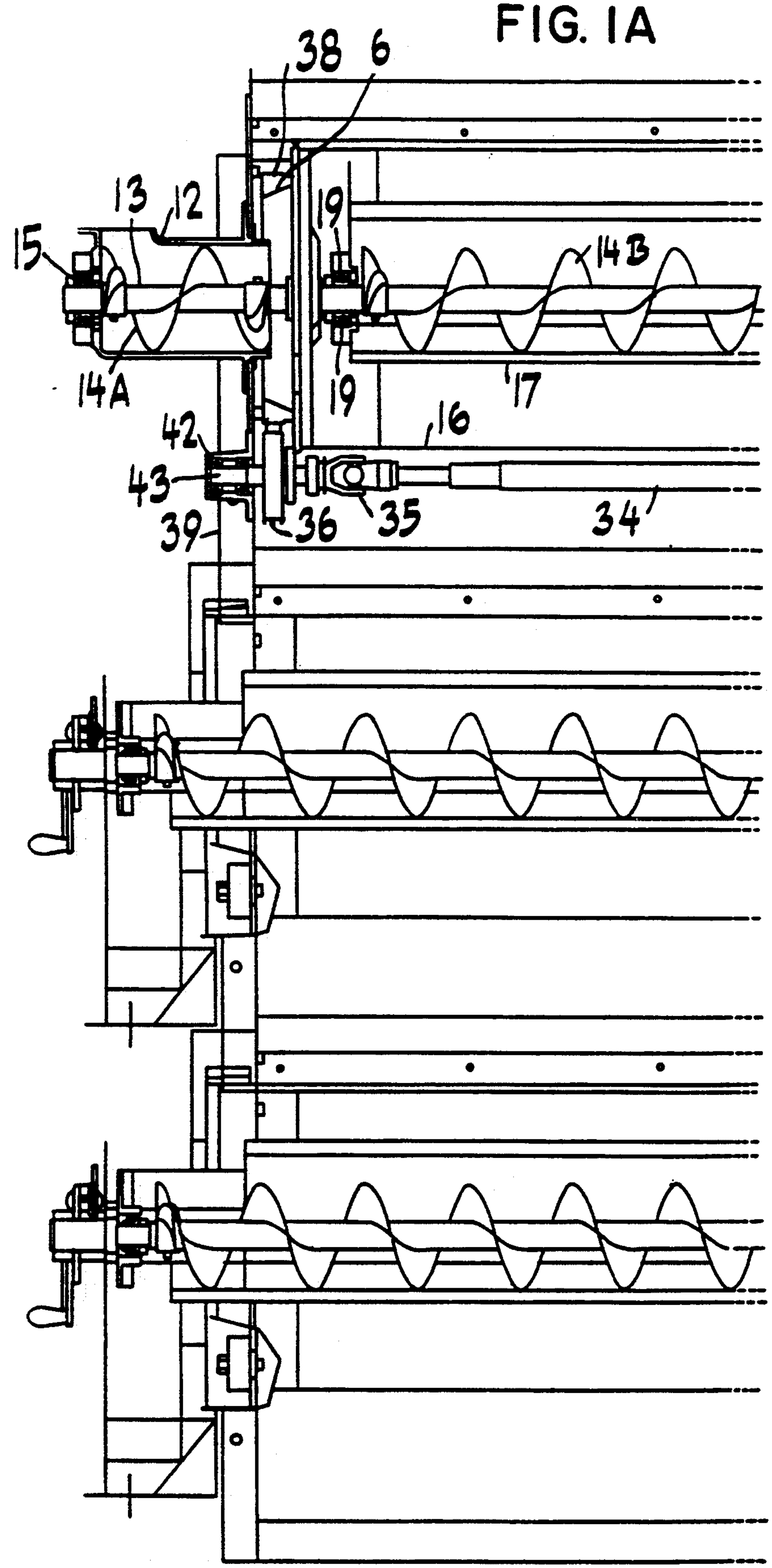
FIG. 1A is a frontal elevation view of a grain separator wherein generally the front cover has been removed for illustrative purposes.
Figure 1B:
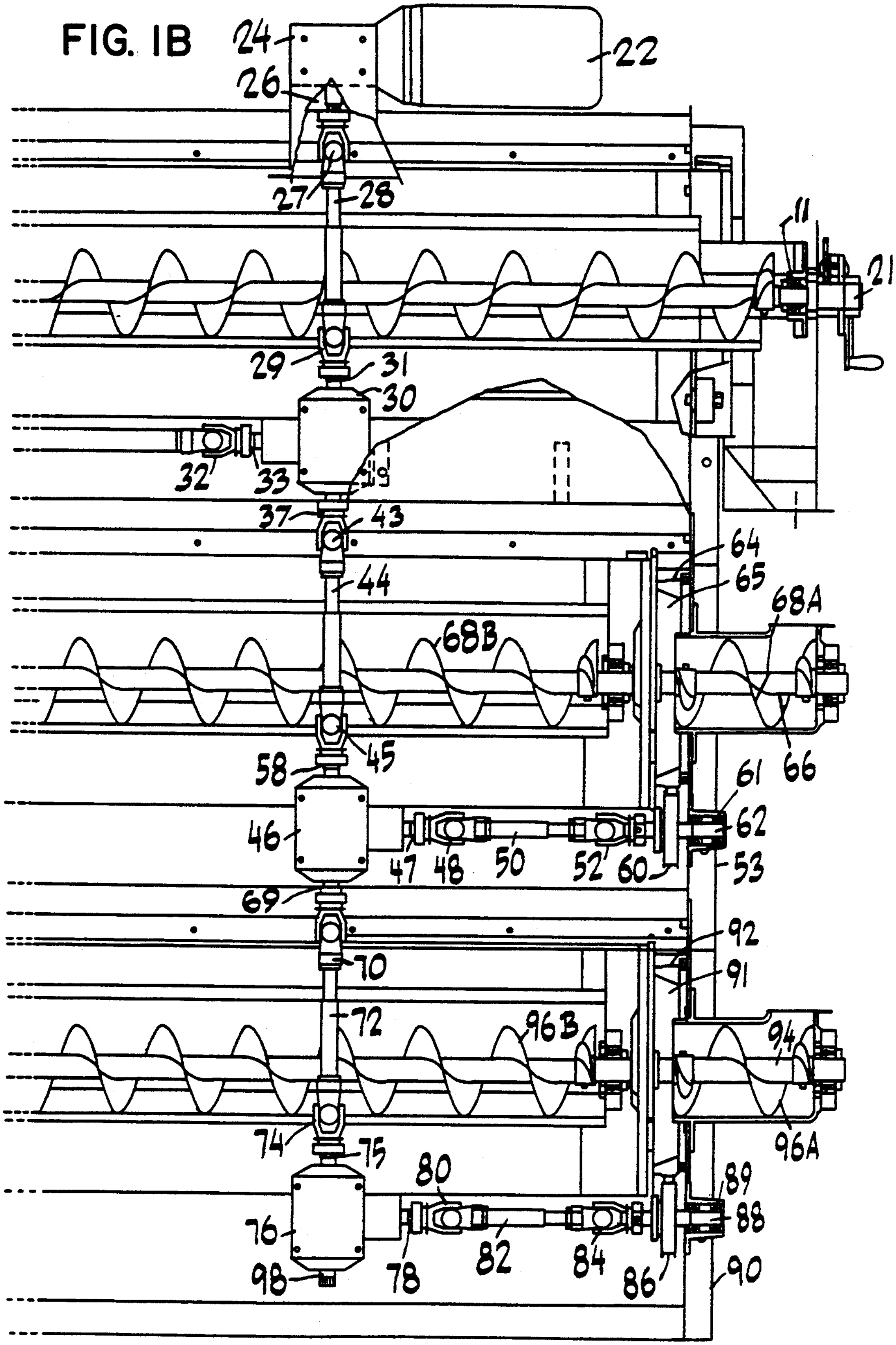
FIG. 1B is a continued frontal elevation view of the grain separator shown in FIG. 1A.
Figure 2A:
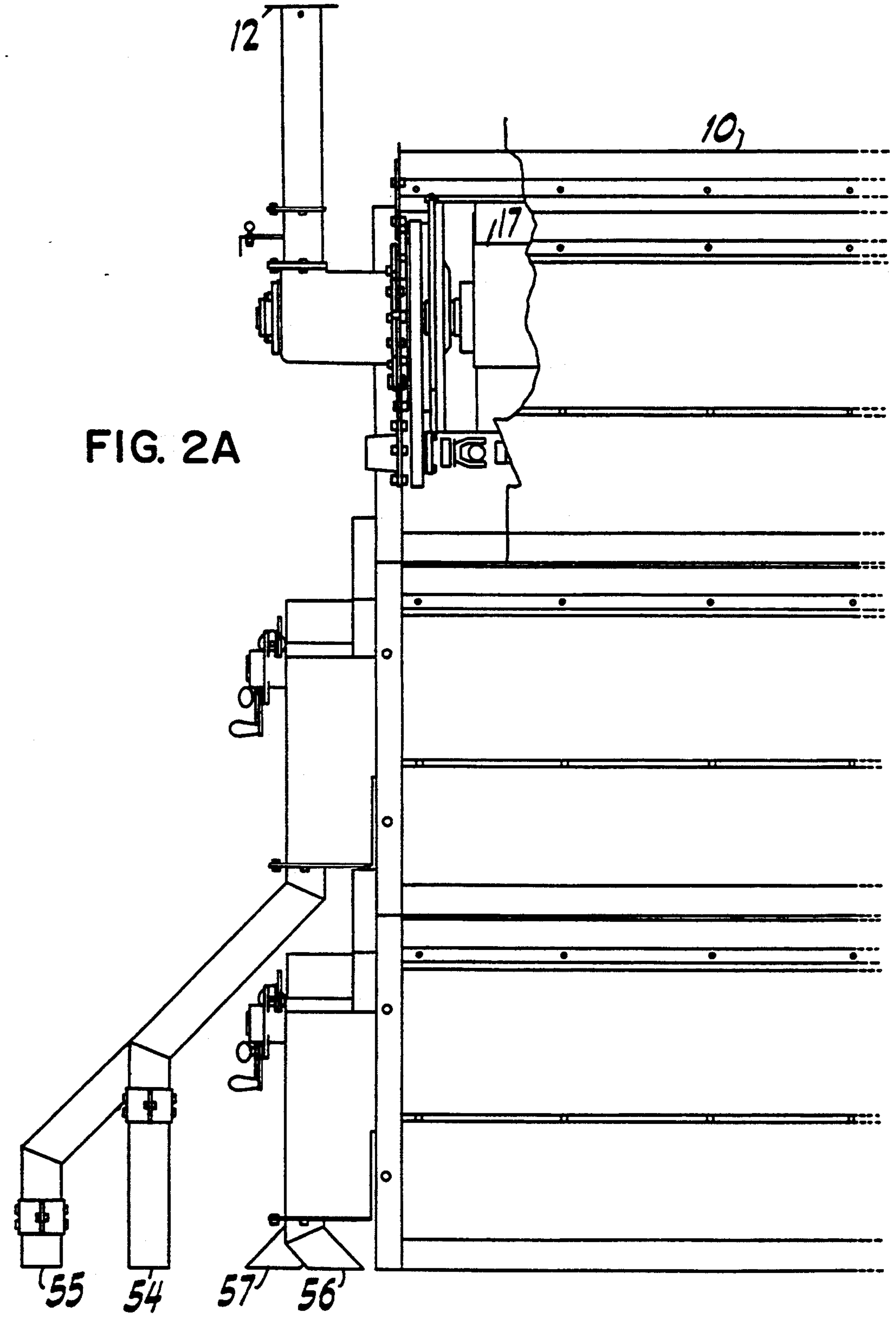
FIG. 2A is a frontal elevation view of the grain separator according to FIG. 1 which includes the front cover and inlet and outlet spouts.
Figure 2B:
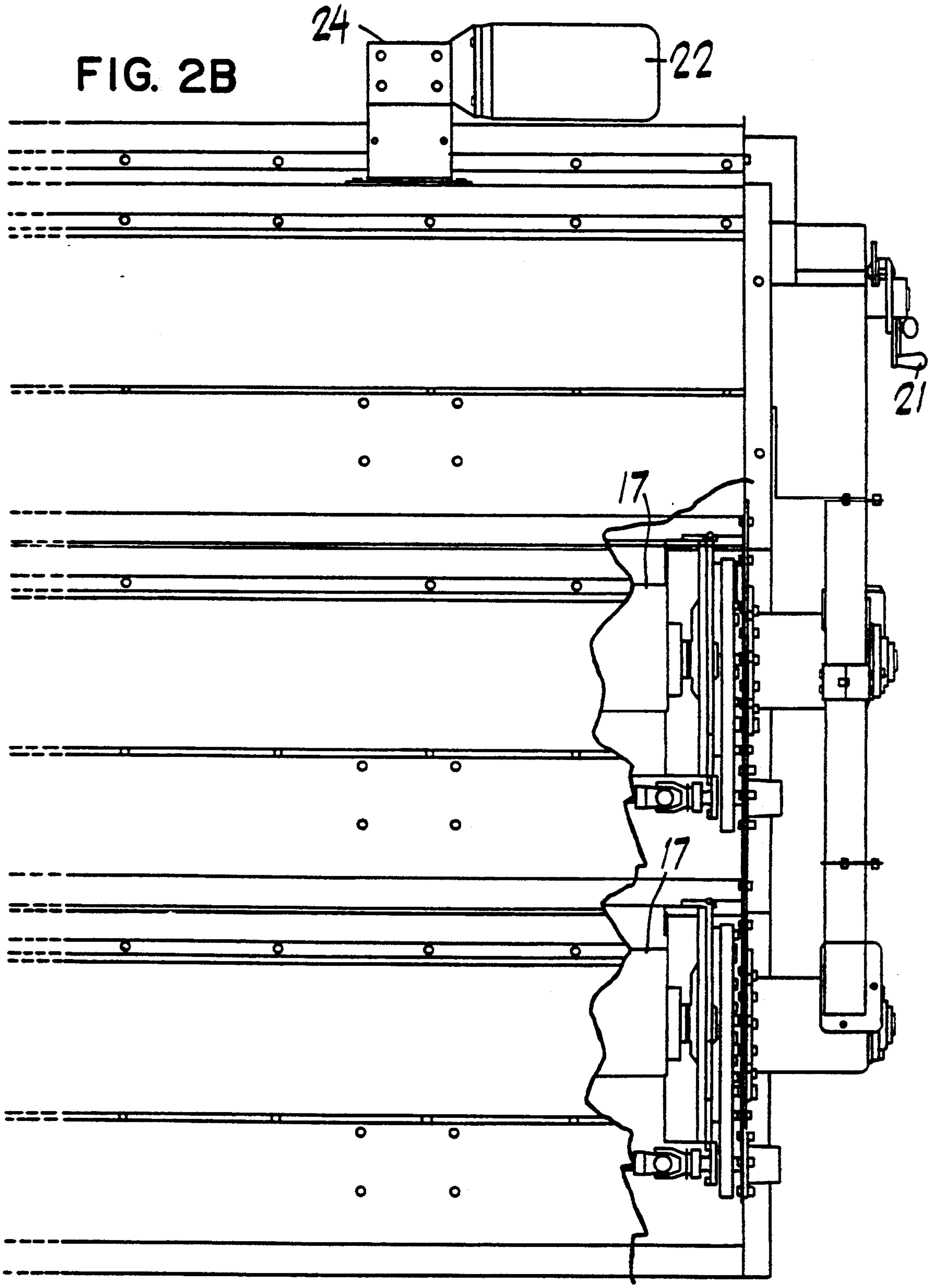
FIG. 2B is a continued frontal elevation view of the grain separator shown in FIG. 2A.
Figure 4:
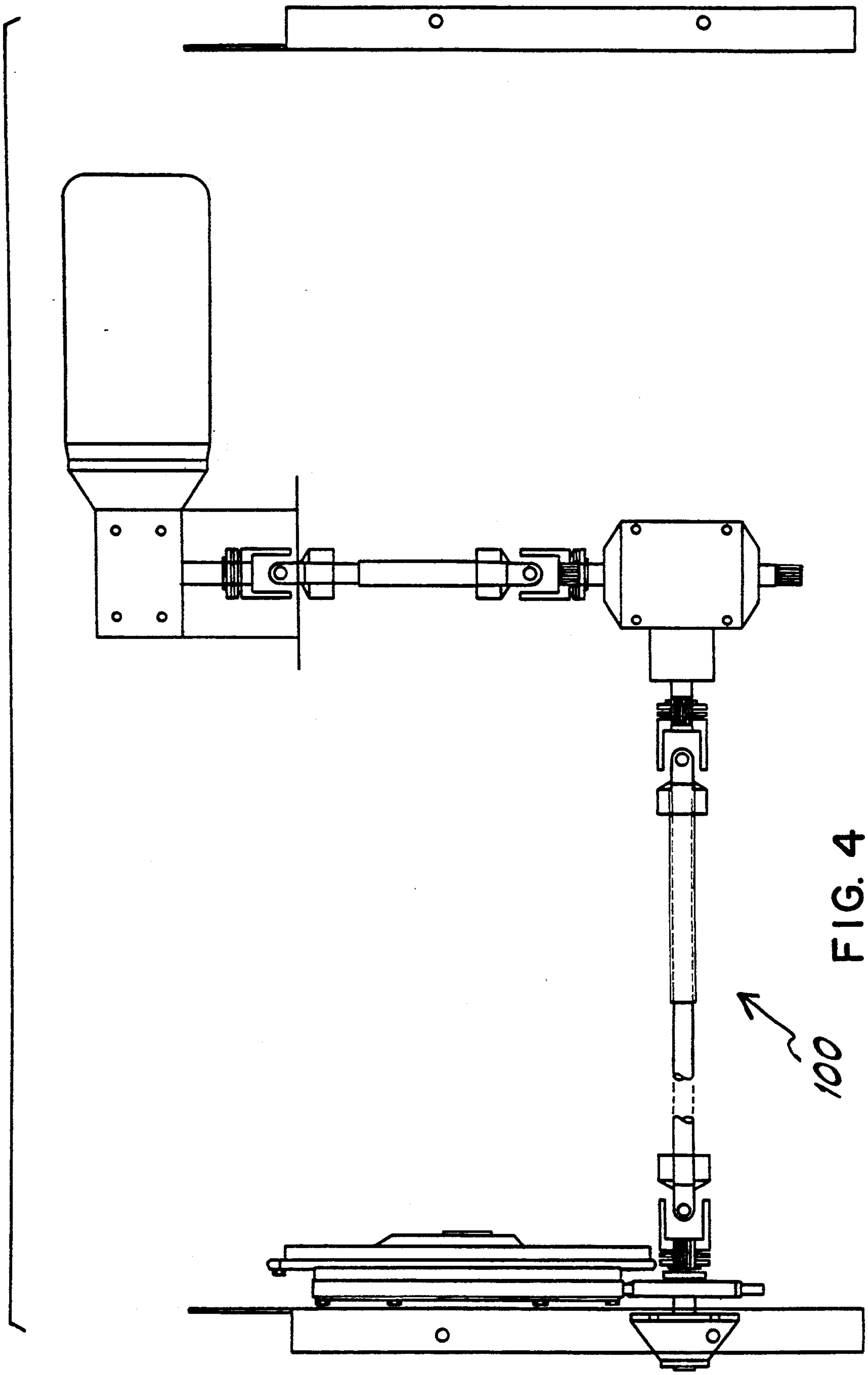
FIG. 4 is an enlarged frontal elevation view of the internal drive system for one of the grain separator units illustrated in FIG. 1.
Figure 5:
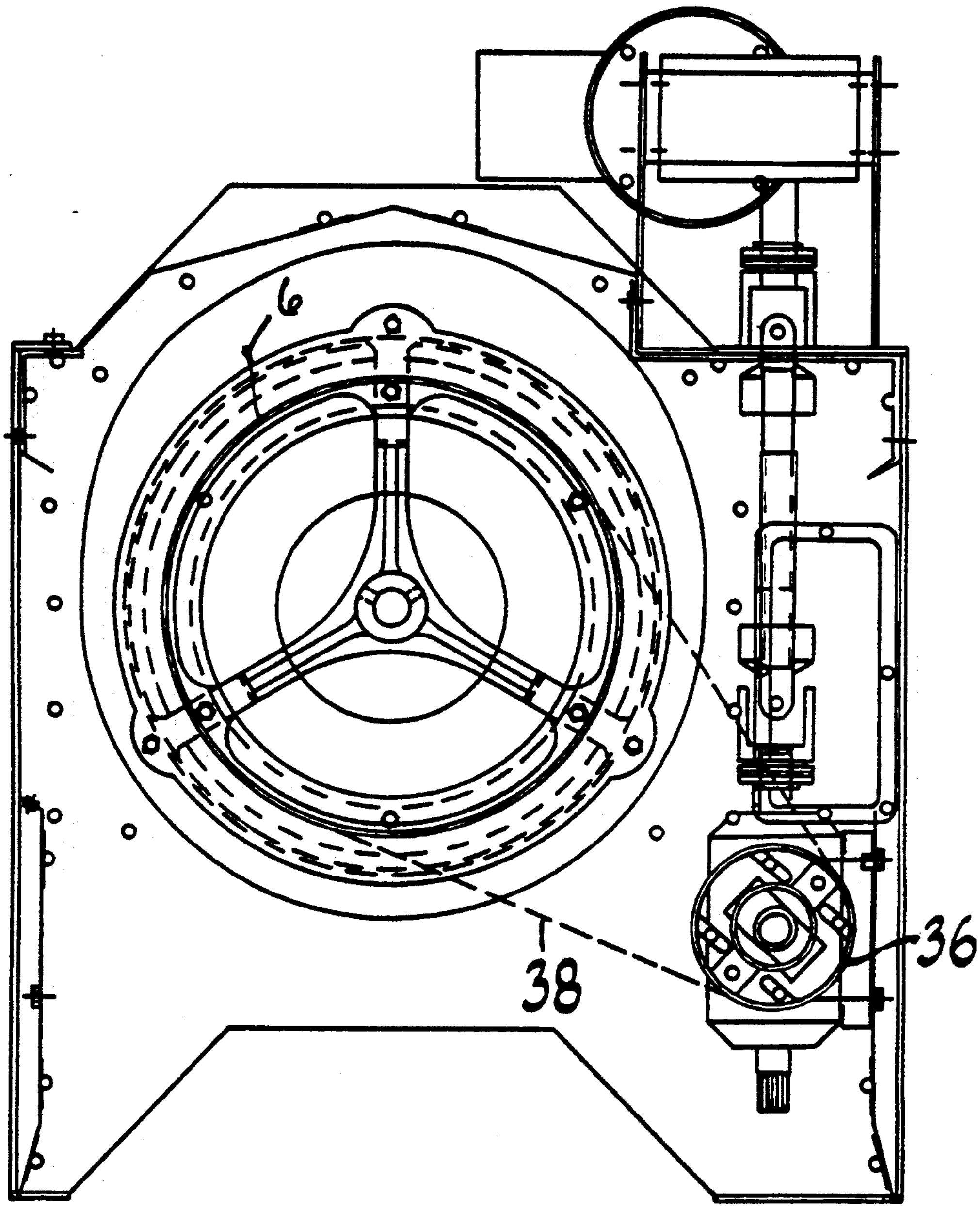
FIG. 5 is a side view of the pulley and belt components of the drive system illustrated in FIG. 4.
Figure 6:
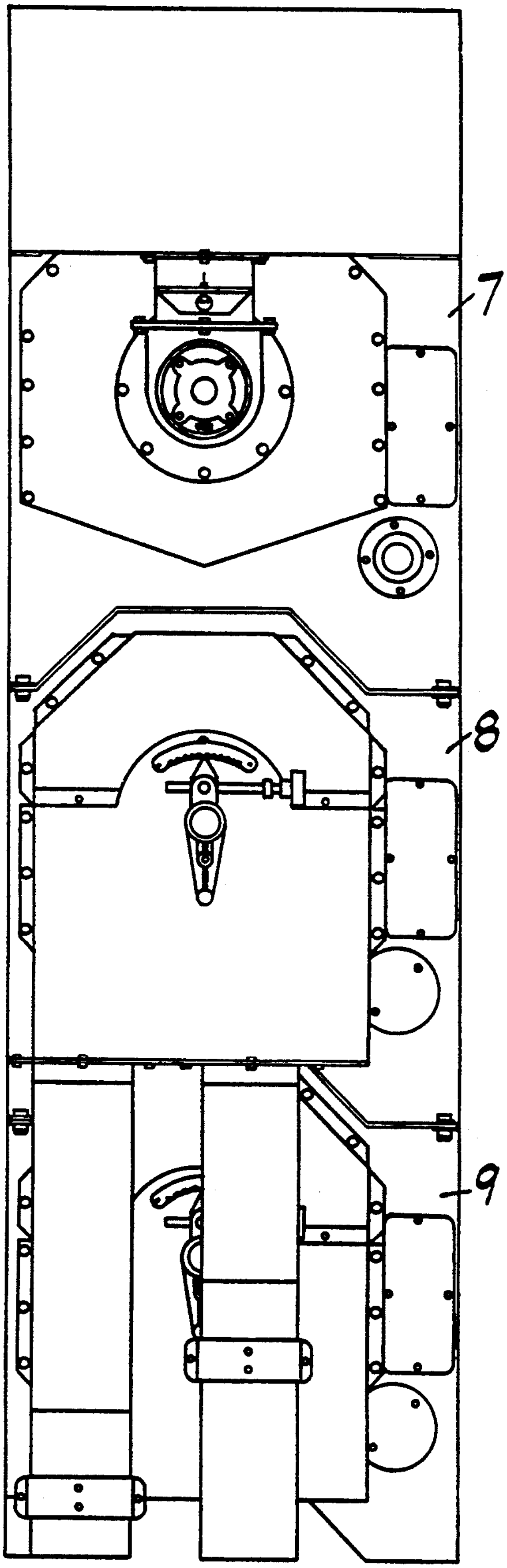
FIG. 6 is a left-side view of the grain separator according to FIG. 2.

Referring to the drawings and first to FIGS. 1A and 1B, there is shown a grain separator 10 according to the present invention. The grain separator 10 illustrated in FIGS. 1A and 1B comprises a plurality of modular grain separator units 7, 8, 9 for separating grain according to size and type of grain. Each modular grain separator unit 7, 8, 9 having an internal modular drive system similar to that indicated as 100 in FIG. 4 for driving the units 7, 8, 9.

The number of grain separator units in a particular installation is selected to effect proper separation. The number of units depends upon the number, type and size of the different grains that are present in the inlet stream. In the illustrative embodiment illustrated in FIGS. 1A and 1B, three grain separator units 7, 8, 9 are shown.

Figure 3:
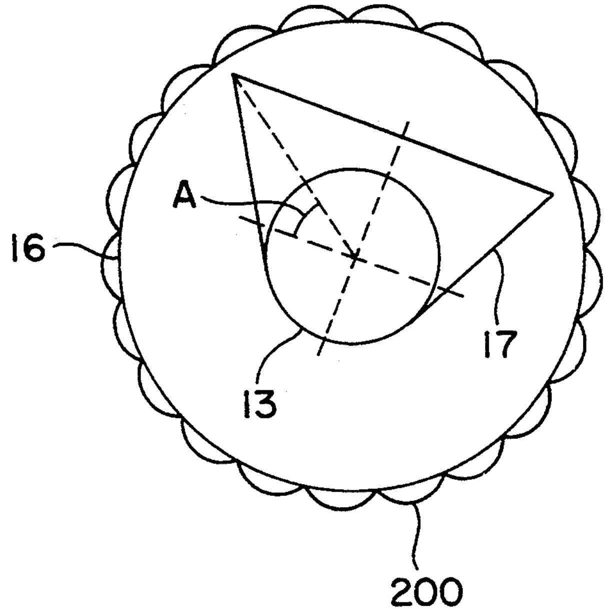
FIG. 3 is a detail taken through line 3—3 in FIG. 1.

The inlet stream of grain to be separated enters the grain separator 10 through inlet feed hopper 12. The grain subsequently moves into the first grain separator unit 7. The grain is moved forward from left to right in FIG. 1 by the motion of a rotatable helical screw 14A. The rotatable helical screw 14A is mounted on a rotatable shaft 13. The shaft 13 is rotatably supported on each end by bearings 15 and 11 and an intermediate bearing 19. As the grain moves out of feed hopper 12, it enters a rotating cylinder 16 shown cut-away in FIG. 1A. Rotatable cylinder 16 is lined on its interior surface with a plurality of semi-spherical indentations 200 as shown in FIG. 3. The indentations 200 remove grain from the inlet stream based on the length of the grain as explained below. Cylinder 16 surrounds rotating helical screw 14B and shaft 13.

Figure 7:
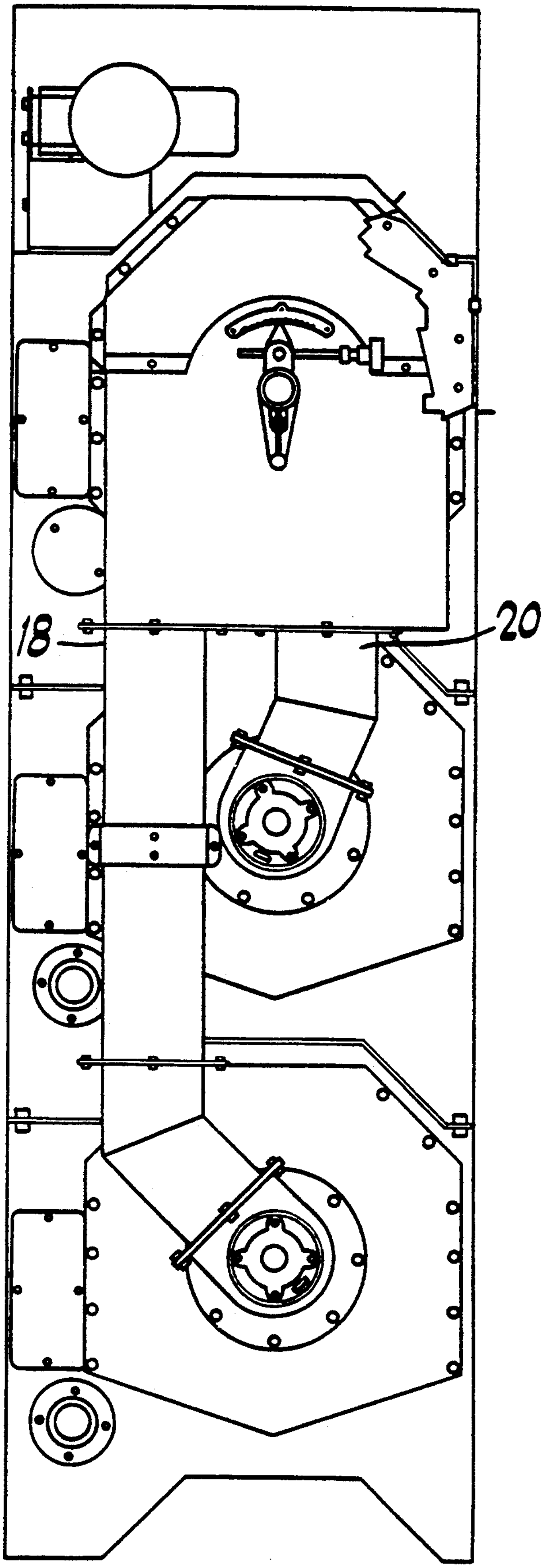
FIG. 7 is a right-side view of the grain separator according to FIG. 2.

A trough 17, shown in cut-away in FIG. 1A and in FIG. 3, is also mounted inside of cylinder 16 and also surrounds rotating helical screw 14B and shaft 13. The trough 17 is open at its top and is mounted on shaft 13. The trough 17 does not rotate with the cylinder 16. However, as illustrated in FIG. 3, the angle of opening A in the trough may be adjusted with respect to the center line of shaft 13. This adjustment may be effected by rotating a handle 21 on the exterior of the grain separator unit 7. Depending on the angle A of the top opening of trough 17 to the center line of shaft 13 the size of the grain to be separated can be precisely controlled. As stated above, grain of a certain length will be lifted by the indentations in cylinder 16. The grain raised by the indentations, depending on the angle A of the trough opening to the centerline of shaft 13, will either travel over the edge of the trough and enter into the trough 17 or be returned to cylinder 16. Grain of other lengths will not be lifted up by the indentations in the surface of cylinder 16 and will remain therein. Thus, separation of the grain into two streams will take place. The two streams of grain will continue to travel axially along the cylinder 16 and trough 17. At the other end, the two streams of grain will exit through a first outlet spout 18 and a second outlet spout 20 respectively. As illustrated in FIG. 7, the grain exiting through outlet spout 18 will feed into the inlet feed hopper of the second separator unit 8 while the grain exiting through outlet spout 20 will feed into the inlet feed hopper of the third separator unit 9. The grain separation process described above will then similarly occur in each of the grain separator units 8 and 9. The grain from separator unit 8 will separate into two streams and will exit through outlet spout 54 and outlet spout 55 respectively. The grain from separator unit 9 will separate into two streams and will exit from outlet spout 56 and outlet spout 57 respectively. Grain separator units 8 and 9 are composed of essentially the same separation components as described above for grain separator unit 7.

The modular drive system for the grain separator 10 is located internal to the grain separator units 7, 8, 9 and thus does not interfere with the spouts of the grain separator units 7, 8, 9. The drive system is of a modular nature so that, depending upon the required grain separation parameters, the necessary number of grain separation units can be easily arranged and stacked. In addition, the components of the drive system are sealed and operate in a relatively clean environment. Preferably, the internal drive system is generally arranged so that the shaft and rotatable helical screw are driven from the grain inlet end of the grain separator unit.

FIGS. 1A, 1B, 4 and 5 illustrate the drive system for the grain separator 10. The three unit grain separator 10 is driven by one electric motor 22. Illustratively, electric motor 22 is a two horsepower, 1800 rpm, A.C., explosion-proof motor. The electric motor 22 supplies power to the drive system through a worm gear speed reducer 24. The worm gear speed reducer has a ratio of 10 to 1 and has a spline shaft 26 at its outlet. The spline shaft 26 is coupled to a universal joint 27 which in turn is coupled to a rotatable telescoping drive shaft 28. The drive shaft 28 is coupled at the opposite end to another universal joint 29 which is identical to universal joint 27. Universal joint 29 is coupled to a bevel gear box 30 through a spline shaft 31. The bevel gear box 30 transmits power through two outlet shafts. At one of its outlets, the bevel gear box 30 is coupled by a spline shaft 33 to another identical universal joint 32. Universal joint 32 in turn is coupled to a second rotatable telescoping drive shaft 34. Telescoping drive shaft 34 connects with another identical universal joint 35 at the other end thereof. Universal joint 35 connects to a small pulley 36 which is rotatably mounted on the free end of a stub shaft 42. The stub shaft 42 is rotatably mounted in bearings 43 on a wall 39 of grain separator 10. A larger pulley 6 is mounted on shaft 13, near the grain inlet end, and is aligned with small pulley 36. A drive belt 38 is mounted on pulleys 6 and 36 and transmits power from drive shaft 34 to shaft 13. Thus, when rotatable drive shaft 34 is rotating, shaft 13 is rotated by the action of drive belt 38 between pulleys 6 and 36. With shaft 13 and consequently helical screw 14A and 14B in motion, the grain is drawn through inlet feed hopper 12 and the grain separation process described above is commenced.

The bevel gear box 30 is coupled at its other outlet shaft to the drive system for grain separator unit 8. At this outlet, bevel gear box 30 is coupled via a spline shaft 37 to another identical universal joint 43. Universal joint 43 is coupled to another rotatable telescoping drive shaft 44. Telescoping drive shaft 44 is identical to telescoping drive shaft 28. Telescoping drive shaft 44 is coupled to a universal joint 45 at the other end thereof. Universal joint 45 is coupled by a spline shaft 58 to a second bevel gear box 46. Bevel gear box 46 is identical to bevel gear box 30 with two outlet shafts for power transmission.

Bevel gear box 46 is coupled at one outlet via a spline shaft 47 to a universal joint 48. Universal joint 48 is coupled to a rotatable telescoping drive shaft 50. Telescoping drive shaft 50 is identical to telescoping drive shafts 44 and 28. Telescoping drive shaft 50 is coupled to a universal joint 52. Universal joint 52 is coupled to a small pulley 60 which is mounted on the free end of a second stub shaft 62. The stub shaft 62 is rotatably mounted in bearings 61 on a wall 53 of grain separator 10. A large pulley 65 is mounted on a shaft 66 and is aligned with small pulley 60. A drive belt 64 is mounted on pulleys 65 and 60. Rotatable helical screws 68A and 68B identical to helical screws 14A and 14B are mounted on shaft 66. Drive belt 64 thus transmits power from drive shaft 50 to shaft 66. As described above for grain separator unit 7, shaft 66 and helical screws 68A and 68B will be rotated by the action of drive belt 64 between pulleys 65 and 60. Consequently, grain will be moved through the grain separator unit 8 and further separation will occur.

Bevel gear box 46 is coupled at its other outlet shaft to the drive system for grain separator unit 9. At this outlet, bevel gear box 46 is coupled via a spline shaft 69 to a universal joint 70. Universal joint 70 is coupled to a rotatable telescoping drive shaft 72 which is identical to rotatable telescoping drive shafts 50, 44 and 28. Telescoping drive shaft 72 is coupled on its opposite end to a universal joint 74. Universal joint 74 in turn is coupled via a spline shaft 75 to a third bevel gear box 76. Bevel gear box 76 is identical to bevel gear boxes 46 and 30. At its outlet bevel gear box 76 is coupled via a spline shaft 78 to a universal joint 80. Universal joint 80, in turn, is coupled to a rotatable telescoping drive shaft 82. Telescoping drive shaft 82 is coupled at the opposite end to a universal joint 84. Universal joint 84 is coupled to a small pulley 86 which is mounted on the free end of a third stub shaft 88. The stub shaft 88 is rotatably mounted in bearings 89 on a wall 90 of grain separator 10. A large pulley 91 is mounted on a shaft 94 and is aligned with small pulley 86. A drive belt 92 is mounted on pulleys 91 and 86. Rotatable helical screws 96A and 96B, identical to helical screws 14A and 14B are mounted on shaft 94. Drive belt 92 thus transmits power from drive shaft 82 to shaft 94. As described above for grain separator 7, shaft 94 and helical screws 96A and 96B will be rotated by the action of drive belt 92 between pulleys 91 and 86. Consequently, grain will be moved through the grain separator unit 9 and further separation will occur.

In operation, each of the grain separator units 7, 8, 9 are driven by the electric motor 22 through speed reducer box 24. Speed reducer box 24 in turn rotates drive shaft 28 which powers bevel gear box 30. Bevel gear box 30 in turn supplies power to drive shaft 34. Thus, drive shaft 34 and pulley 36 are rotated. Through the action of belt 38, pulley 6 mounted on shaft 13 is also rotated. The consequent rotation of drive shaft 13 commences the grain separation process in grain separator unit 7.

Bevel gear box 30 at its other outlet is connected to the drive system for grain separator unit 8. Thus bevel gear box 30 rotates drive shaft 44 which in turn supplies power to bevel gear box 46. Bevel gear box 46 in turn causes drive shaft 50 to rotate along with pulley 60. Through the action of drive belt 64 pulley 60 causes pulley 65 to rotate. Pulley 65 which is mounted on drive shaft 66 thus causes shaft 66 to rotate and consequently the grain separation process in grain separator unit 8 commences.

Bevel gear box 46 at its other outlet is coupled to the drive system for grain separator unit 9. Bevel gear box 46 thus causes drive shaft 72 to rotate and powers bevel gear box 76. Bevel gear box 76 causes drive shaft 82 to rotate and also pulley 86 which is coupled to drive shaft 82. Through the action of drive belt 92, pulley 86 causes pulley 91 to rotate. Pulley 91 which is mounted on drive shaft 94 causes drive shaft 94 to rotate and consequently the grain separation process in grain separator unit 9 commences.

When the grain separation parameters require additional steps of grain separation, additional modular grain separator units can be easily arranged in the stack. The additional units would be substantially similar to the grain separator units 7, 8, 9 and would have drive systems coupled in a manner similar to that described above. For example, the first additional unit would be coupled to the second power outlet shaft 98 on bevel gear box 76.

As described above, many of the parts of the drive system are identical and modular in nature. In addition the components of the drive system are sealed and internal to the grain separator units. Therefore, the layout of the stacked grain separator units is much less complicated than in existing separator units where the drive systems are external to the separator unit.

Generally, in operation of the preferred embodiment shown in the drawings, grain will enter the inlet feed hopper 12 and subsequently be propelled by rotatable helical screw 14A. The grain will then enter rotatable cylinder 16 which is lined on its interior surface with a plurality of semi-spherical indentations 200. The indentations 200 will remove grain from the inlet stream based on the length of the grain. The grain will then be lifted up and depending on the relative angle A of trough 17 to the center line of shaft 13, certain grain will enter the trough 17 and other grain will return to the interior of rotatable cylinder 16. Thus, two streams of separated grain will be formed. One stream will exit grain separator unit 7 through outlet spout 18. While the second grain stream will exit through outlet spout 20. The grain exiting through outlet spout 18 will feed into the inlet feed hopper of the second separator unit 8 while the grain exiting through outlet spout 20 will feed into the inlet feed hopper of the third separator unit 9. The grain separation process described above will then similarly occur in each of the grain separator units 8 and 9.

As described above, the grain separator 10 is comprised of modular grain separator units 7, 8, 9 and is driven by the modular internal drive system. Thus, the present invention will be able to provide for the varied needs of users through a grain separator which is compact, relatively easy to construct and erect, and provides for increased life of the drive system components.

The invention in its broader aspects is not limited to the described embodiment and departures may be made therefrom within the scope of the accompanying claims without departing from the principles of the invention and without sacrificing its chief advantages.

What is claimed is:

1. A grain separator, comprising a) a plurality of operatively connected separator units;

b) a grain inlet for feeding grain into the grain separator;

c) a rotatable means operatively connected to said grain inlet for moving grain through the separator, wherein said rotatable means comprises a shaft and a rotatable helical screw mounted thereon;

d) a separation means operating in conjunction with said rotatable means for separating the grain from said grain inlet into a first stream of grain and a second stream of grain, wherein said separation means comprises a rotating cylinder surrounding said shaft having indentations on its internal surface and a trough internal to said rotating cylinder having a top opening adjustable with respect to the center line of said shaft;

e) a first grain outlet operatively connected to said separation means;

f) a second grain outlet operatively connected to said separation means;

g) an internal drive means for operating said separator units, wherein said internal drive means comprises:

(1) a first rotatable telescoping drive shaft having a first end and a second end;

(2) a bevel gear box coupled to said first end of said first drive shaft;

(3) a second rotatable telescoping drive shaft having a first end and a second end;

(4) a bevel gear box coupled to said first end of said second drive shaft;

(5) a first pulley coupled to said second end of said second drive shaft;

(6) a second pulley mounted on the separator; and (7) a drive belt connecting said first and second pulleys; and h) a coupling means for separably connecting said internal drive means of each unit for operating said units, wherein the number of operating separator units can be varied.

2. The device according to claim 1 wherein the coupling means comprises a spline shaft coupled to a second outlet of the bevel gear box.

3. The device according to claim 2 wherein the grain separator is driven by an electric motor coupled to a worm gear speed reducer having an outlet shaft wherein the outlet shaft is coupled to the second end of the first rotatable telescoping drive shaft.

4. A grain separator, comprising:
a) a plurality of vertically arranged and operatively connected separator units;
b) a grain inlet for feeding grain into the grain separator;
c) a rotatable means operatively connected to said grain inlet for moving grain through the separator, wherein said rotatable means comprises a shaft and a rotatable helical screw mounted thereon;
d) a separator means operating in conjunction with said rotatable means for separating the grain from said grain inlet into a first stream of grain and a second stream of grain, wherein said separation means comprises a rotating cylinder surrounding said shaft having indentations on its internal surface and a trough internal to said rotating cylinder having a top opening adjustable with respect to the center line of said shaft;
e) a first grain outlet operatively connected to said separation means;
f) a second grain outlet operatively connected to said separation means;
g) an internal drive means for operating said separator units, wherein said internal drive mean comprises:
(1) a first rotatable telescoping drive shaft having a first end and a second end;
(2) a bevel gear box coupled to said first end of said first drive shaft;
(3) a second rotatable telescoping drive shaft having a first end and a second end;
(4) a bevel gear box coupled to said first end of said second drive shaft;
(5) a first pulley coupled to said second end of said second drive shaft;
(6) a second pulley mounted on the separator; and
(7) a drive belt connecting said first and second pulleys, wherein said internal drive means is positioned for propelling grain through said separator units; and
h) a coupling means for separably connecting said internal drive means of each unit for operating said units, wherein the number of operating separator units can be varied, and wherein each of said grain separator units are driven from the grain inlet end of said separator units.

5. The device according to claim 4, wherein the coupling means comprises a spline shaft coupled to a second outlet of the bevel gear box.

6. The device according to claim 5, wherein the grain separator is driven by an electric motor coupled to a worm gear speed reducer having an outlet shaft wherein the outlet shaft is coupled to the second end of the first rotatable telescoping drive shaft.

7. A grain separator, comprising:
a) a plurality of vertically arranged and operatively connected separator units;
b) a grain inlet for feeding grain into the grain separator;
c) a rotatable means operatively connected to said grain inlet for moving grain through the separator, wherein said rotatable means comprises a shaft and a rotatable helical screw mounted thereon;
d) a separation means operating in conjunction with said rotatable means for separating the grain from said grain inlet into a first stream of grain and a second stream of grain, wherein said separation means comprises a rotating cylinder surrounding said shaft having indentations on its internal surface and a trough internal to said rotating cylinder having a top opening adjustable with respect to the center line of said shaft;
e) a first grain outlet operatively connected to said separation means;
f) a second grain outlet operatively connected to said separation means;
g) an internal drive means for operating said separator units, wherein said internal drive means comprises:
(1) a first rotatable telescoping drive shaft having a first end and a second end;
(2) a bevel gear box coupled to said first end of said first drive shaft;
(3) a second rotatable telescoping drive shaft having a first end and a second end;
(4) a bevel gear box coupled to said first end of said second drive shaft;
(5) a first pulley coupled to said second end of said second drive shaft;
(6) a second pulley mounted on the separator; and
(7) a drive belt connecting said first and second pulleys, wherein each of said separator units comprises a coupling attached thereto for separably coupling said internal drive means of each of said separator units; and
h) a coupling means for separably connecting said internal drive means of each unit for operating said units, wherein the number of operating separator units can be varied.

8. The device according to claim 7, wherein the coupling means comprises a spline shaft coupled to a second outlet of the bevel gear box.

9. The device according to claim 8, wherein the grain separator is driven by an electric motor coupled to a worm gear speed reducer having an outlet shaft wherein the outlet shaft is coupled to the second end of the first rotatable telescoping drive shaft.

* * * * *